United States Patent Office 3,442,890
Patented May 6, 1969

3,442,890
SUBSTITUTED 3-BENZAZOCIN-16-ONES
Aubrey A. Larsen, Evansville, Ind., and Homer C. Scarborough, deceased, late of Evansville, Ind., by Phyllis Jean Scarborough, personal representative, Evansville, Ind., assignors to Mead Johnson & Company, Evansville, Ind., a corporation of Indiana
No Drawing. Filed June 15, 1965, Ser. No. 464,239
Int. Cl. C07d 41/00; C07c 143/74; A61k 27/00
U.S. Cl. 260—239                                10 Claims

ABSTRACT OF THE DISCLOSURE

Substituted and unsubstituted 3-sulfo-1,2,3,4,5,6-hexahydro-3-benzazocin-6-ones, have central nervous system depressant, anti-inflammatory, and uricosuric properties. Compounds are prepared by cyclization of 3-(N-R sulfonylphenalkylaminopropionyl) chlorides or bromides, wherein R is alkyl, aryl, aralkyl or dialkylamino. The cyclization takes place in the presence of Friedel-Crafts catalysts.

This invention involves a novel class of chemical compounds which possess biological activity and which are useful as chemical intermediates in the synthesis of other biologically active substances. The present compounds are substituted- or unsubstituted-3-sulfo-1,2,3,4,5,6-hexahydro-3-benzazocin-6-ones. They are represented by the following structural formula in which the positions of the rings are numbered for nomenclature purposes:

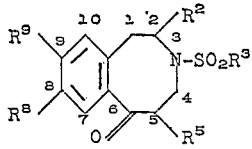

FORMULA I

In the formula, $R^2$ and $R^5$ represent hydrogen atoms or lower alkyl groups of from about 1 to 4 carbon atoms such as methyl, ethyl, isopropyl, and n-butyl. $R^3$ may be a hydroxyl group in which event the product is a substituted sulfamic acid, a lower alkoxy group having up to about 6 carbon atoms in which event the product is an ester of a substituted sulfamic acid, a di-lower alkylamino group such as dimethylamino, diethylamino, or dihexylamino in which event the product is an amide of a substituted sulfamic acid. $R^3$ may also be a lower alkyl group of up to about 6 carbon atoms, an aryl group of up to about 12 carbons atoms, or an aralkyl group of up to about 12 carbon atoms. These products are sulfonamides. $R^8$ and $R^9$ may be hydrogen, lower alkyl of up to about 4 carbon atoms, or lower alkoxy of up to about 4 carbon atoms. Suitable alkoxy groups are methoxy, butoxy, and ethoxy. $R^8$ and $R^9$ may be joined to form the methylenedioxy group.

The compounds of Formula I have been found to possess biological activity in various animal tests. The pharmacologic actions shown in these tests characterize the substances as central nervous system depressants, anti-inflammatory, and uricosuric agents. These actions are observed when non-toxic doses are administered by either the parenteral or oral routes. Dosages of up to about 40-200 mg./kg. are effective, while the acute toxicities ($LD_{50}$) are in excess of 800 mg./kg.

Specific uses of certain of the present substances as intermediates are disclosed in copending application Ser. No. 464,241, filed herewith. Of particular interest in this regard are those substances of Formula I wherein $R^3$ is alkyl, aryl, or aralkyl. Those substances of Formula I in which $R^3$ is dialkylamino are suited as intermediates for conversion by hydrolysis or alcoholysis, as is disclosed herein, into corresponding substituted sulfamic acids or esters of Formula I wherein $R^3$ is hydroxy or alkoxy.

The compounds of Formula I wherein $R^3$ is other than hydroxy or alkoxy are prepared by cyclization of 3-(N-R-sulfonylphenalkylamino)propionyl chlorides or bromides wherein R refers to an alkyl, aryl, aralkyl, or dialkylamino group as defined for $R^3$. The reaction takes place under the influence of aluminum chloride or bromide according to the well-known technique of carrying out Friedel-Crafts reactions. It is preferred in most cases to carry out the process with a dilute solution of the acid halide since this favors the desired intramolecular cyclization at the expense of inter-molecular side reactions. The process is illustrated by the following reaction scheme.

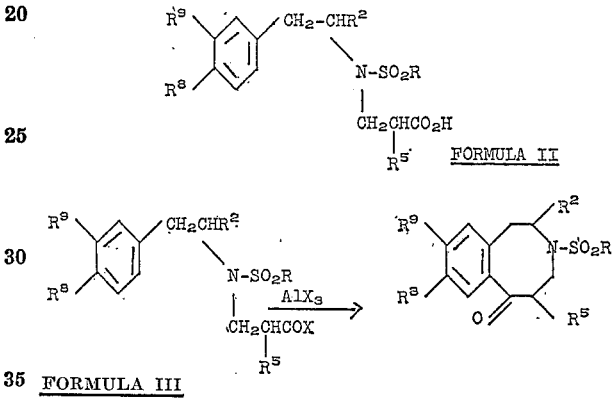

FORMULA III

In the above formulas R has been defined above as a selected $R^3$ substituent, and X is chlorine or bromine. The substances of Formula II are prepared by the addition reaction of a phenethylamine with a lower alkyl ester of an acrylic acid followed by reaction of a sulfonyl halide, $RSO_2X$, therewith in the presence of base. The resulting N-sulfonylamino ester is then hydrolized to the corresponding substituted N-sulfonylaminopropionic acid which is converted to the acid chloride or bromide to provide the intermediate of Formula III. Procedures 1 and 2 which follow are representative of methods for the preparation of the 3-(N-sulfonylphenethylamino)propionic acid starting materials.

It is generally convenient to prepare the propionyl chloride or bromide of Formula III in situ from the corresponding propionic acid by reaction with thionyl chloride in an inert solvent. Cyclization is then carried out after distillation of excess thionyl chloride and addition of a solution of the residual propionyl chloride in an inert organic solvent to a dilute suspension of aluminum halide in a similar solvent. The usual solvents for Friedel and Crafts reactions such as nitrobenzene and carbon disulfide are operable. It is preferred, however, to use a halogenated alkane of which chloroform, carbon tetrachloride, ethylene dichloride, tetrachloroethane, and methylene chloride are examples. The latter is preferred.

Operation at high dilution according to the present invention requires that sufficiently low concentration of propionyl halide of Formula III be present in the reaction zone at any given instant so that intermolecular condensation thereof is essentially eliminated. To accomplish this, about 15 l. of solvent for each mole of propionyl halide reactant is employed. An excess of aluminum halide relative to propionyl halide starting material serves to given improved yields, from about 1.1 to 2.5 molecular proportions of aluminum halide per mole of propionyl halide reactant providing satisfactory results. It is preferred to employ aluminum chloride with propionyl chloride starting materials in the molar ratio of about 2 to 1. A reaction temperature in the range of 35–60° C. and preferably 40–45° C. gives the best results. Methylene chloride has been found particularly satisfactory as solvent since the reflux temperature thereof falls within this range. A total reaction period of 2–3 hrs. is recommended measured from the first addition of 3-(N-sulfonylphenethylamino)propionyl chloride.

The following examples are given to illustrate in more detail methods for the preparation of the compounds of the present invention.

Procedure 1.—3-(N-benzenesulfonylphenethylamino)-propionic acid

To a solution of 121 g. (1 mole) of phenethylamine in 200 ml. of absolute ethanol there is added 104 g. (1.04 mole) of ethyl acrylate. External cooling of the reaction vessel is employed to prevent the reaction temperature from exceeding 60° C. When cooling is no longer necessary, the solution is kept at room temperature for 24 hrs. and then concentrated in vacuo to an oil. The oil is dissolved in 3 to 4 l. of ethyl ether and 131.6 g. (1.3 mole) of triethylamine is added thereto, followed by 211 g. (153 ml., 1.2 mole) of benzenesulfonyl chloride. Again the reaction solution is kept overnight at room temperature with stirring. Triethylamine hydrochloride separates as a by-product of the reaction during this period. It is removed by filtration and the filtrate concentrated in vacuo. The residual oil is then dissolved in 750 ml. of acetone, again filtered to remove insoluble material, and the acetone solution mixed with 250 ml. of aqueous sodium hydroxide solution containing 60 g. (1.5 mole) of sodium hydroxide. This mixture is then heated on the steam bath for 1½ hrs., resulting in saponification of the crude ethyl 3-(N-benzenesulfonylphenethylamino)propionate formed by the preceding treatment. Remaining ester which fails to hydrolyze is removed by extraction with ether and separation of the organic layer. The aqueous layer is then chilled and treated with sufficient hydrochloric acid to effect complete precipitation of the desired acid. The precipitate is dissolved in ether, the ether layer separated, washed with water, and dried over anhydrous magnesium sulfate. Diethylamine is then added to the ethereal solution until no further precipitation occurs. The diethylammonium salt of the desired acid separates as an oil which crystallizes on chilling in an ice bath. The crude solid is collected and recrystallized from acetonitrile, yielding the diethyl ammonium salt of 3-(N-benzenesulfonylphenethylamino)propionate. The salt without further purification is dissolved in 1 l. of water and the solution acidified with concentrated hydrochloric acid, resulting in precipitation of the acid as an oily material which is dissolved in ether, dried, and the solvent distilled in vacuo, yielding the product as a waxy, white solid which is twice recrystallized from benzene-heptane; yield 75%, M.P. 69–70° C.

*Analysis.*—Calcd. for $C_{17}H_{19}NO_4S$: C, 61.24; H, 5.74; N, 4.20; and S, 9.62. Found: C, 61.30; H, 5.61; N, 4.00; and S, 9.58.

Procedure 2.—3-(N-methanesulfonylphenethylamino)-propionic acid

The method of Procedure 1 is repeated, substituting an equivalent quantity of methanesulfonyl chloride for the benzenesulfonyl chloride specified for that process; yield 37%, M.P. 113–115° C.

*Analysis.*—Calcd. for $C_{12}H_{17}NO_4S$: C, 53.12; H, 6.32; N, 5.16; and S, 11.82. Found: C, 53.35; H, 6.48; N, 4.92; S, 11.65.

Procedure 3.—3-(N-dimethylsulfamoylphenethylamino)propionic acid

The method of Procedure 1 is adapted to the use of dimethylsulfonyl chloride as a reactant in place of the benzenesulfonyl chloride specified in Procedure 1. The desired product is obtained as a viscous oil on hydrolysis of the intermediate ester in 57% yield. This material is used for further transformation in Example 3 without additional purification.

Procedure 4.—3-(N-benzenesulfonyl-3,4-dimethoxyphenethylamino)propionic acid 3,4-dimethoxyphenethylamine is substituted for phenethylamine in the method of Procedure 1 to afford the desired substituted propionic acid in 69% yield, M.P. 88.5–90.5° C. after recrystallization from benzene-heptane.

*Analysis.*—Calcd. for $C_{19}H_{23}NO_6S$: C, 58.00; H, 5.89; S, 8.15. Found: C, 58.25; H, 6.00; S, 8.34.

The following sulfonyl halides are substituted for benzenesulfonyl chloride in the method of Procedure 1 to provide analagous substituted propionic acids of Formula II containing various R substituents. The latter are then transformed to substituted 3-benzazocin-6-ones according to the method of Example 1.

Butanesulfonyl chloride
2-propanesulfonyl chloride
t-Butylsulfonyl chloride
p-Toluenesulfonyl chloride
2,4-dimethylbenzenesulfonyl chloride
Hexanesulfonyl chloride
Cyclohexanesulfonyl chloride
α-Naphthylsulfonyl chloride
β-Naphthylsulfonyl chloride
α-Naphthylmethylsulfonyl chloride
β-Phenethylsulfonyl chloride
Benzylsulfonyl chloride
Diethylaminosulfonyl chloride
Dihexylaminosulfonyl chloride
Piperidinosulfonyl chloride Example 1.—3-benzenesulfonyl-1,2,3,4,5,6-hexahydro-3-benzazocin-6-one A solution of 66.6 g. (0.2 mole) of 3-(N-benzenesulfonylphenethylamino)propionic acid in 500 ml. of dry methylene chloride is treated with 100 ml. of thionyl chloride at the reflux temperature for 40 min. The reaction mixture is then concentrated in vacuo to remove excess thionyl chloride and solvent, yielding 3-(N-benzenesulfonylphenethylamino)propionyl chloride as a light brown oil which is dissolved in 200 ml. of dry methylene chloride. A suspension of 53.3 g. (0.4 mole) of anhydrous aluminum chloride in 3 l. of dry methylene chloride is then prepared and the solution of propionyl chloride derivative prepared above is added thereto in dropwise fashion with stirring during a period of 1½ hours. The reaction mixture is then heated at reflux for 1¾ hours and then treated while still warm with 500 ml. of water. The organic layer is separated, washed first with 5% aqueous hydrochloric acid and then with water, and dried over magnesium sulfate. Concentration of the supernatant solution yields the desired product as a brown solid, which is recrystallized from isopropyl acetate after treatment with decolorizing carbon to yield the desired product in two crops; yield, 76%, M.P. 158.5–159.5° C.

*Analysis.*—Calcd. for $C_{17}H_{17}NO_3S$: C, 64.74; H, 5.43; N, 4.44; S, 10.17. Found: C, 64.86; H, 5.70; N, 4.59; S, 10.26.

Example 2.—3-methanesulfonyl-1,2,3,4,5,6-hexahydro-3-benzazocin-6-one

The method of Example 1 is applied to 3-(N-methanesulfonylphenethylamino)propionic acid in the manner described to provide the desired product, yield 32%, M.P. 160–162° C.

*Analysis.*—Calcd. for $C_{12}H_{15}NO_3S$: C, 56.89; H, 5.97; N, 5.53; S, 12.66. Found: C, 57.16; H, 6.25; N, 5.80; S, 12.64.

Example 3.—3-(dimethylaminosulfonyl)-1,2,3,4,5,6-hexahydro-3-benzazocin-6-one

The method of Example 1 is repeated substituting 3-(N-dimethylsulfamoylphenethylamino)propionic acid as starting material. The desired product is recovered in substantially the fashion described, and recrystallized from isopropyl acetate, M.P. 107–109° C., yield, 62%.

Analysis.—Calcd. for $C_{13}H_{18}N_2O_3S$: C, 55.30; H, 6.42; N, 6.92; S, 11.35. Found: C, 55.05; H, 6.35; N, 9.83; S, 11.42.

Example 4.—3-ethoxysulfonyl-1,2,3,4,5,6-hexahydro-3-benzazocin-6-one

A mixture of 14.1 g. (0.05 mole) of 3-dimethylaminosulfonyl-1,2,3,4,5,6-hexahydro-3-benzazocin-6-one, 150 ml. 95% ethanol and 150 ml. of 20% hydrochloric acid is refluxed for 48 hours, and the solvent then removed by concentration of the reaction mixture in vacuo. The residual oil is then partitioned between water and chloroform. The chloroform layer is drawn off and washed first with water, then with brine, and dried over anhydrous magnesium sulfate. The chloroform is removed in vacuo, leaving 14 g. of oil which is distilled to give 8.5 g. of product, B.P. 190–220° C./0.18 mm. Crystals form in the distillate on standing, and it is then crystallized from ethanol-water to give 7.5 g. of crystalline solid, M.P. 71–73° C. Two recrystallizations from isopropyl acetate-isopropyl ether yield 4.1 g. (30%) of purified product, M.P. 74–76° C.

Analysis.—Calcd. for $C_{13}H_{17}NO_4S$: C, 55.10; H, 6.05; N, 4.94; S, 11.32. Found: C, 54.91; H, 6.03; N, 4.92; S, 11.32.

Example 5.—3-methoxysulfonyl-1,2,3,4,5,6-hexahydro-3-benzazocin-6-one

This compound is prepared by the method of Example 4, except that methanol is used instead of ethanol. Distillation of the crude oil is not necessary. The product is purified by twice recrystallizing from isopropyl acetate-isopropyl ether yielding 6.7 g. (50%) of analytical material, M.P. 52.5–54.5° C.

Analysis.—Calcd. for $C_{12}H_{15}NO_4S$: C, 53.51; H, 5.6; S, 11.90. Found: C, 53.28; H, 5.52; S, 12.00.

Example 6.—3-sulfo-1,2,3,4,5,6-hexahydro-3-benzazocin-6-one

A mixture of 28.2 g. (0.1 mole) of 3-dimethylaminosulfonyl-1,2,3,4,5,6-hexahydro-3-benzazocin-6-one, 250 ml. of dioxane, and 250 ml. of 20% hydrochloric acid is refluxed for 24 hours. The reaction mixture is concentrated in vacuo to an oil which is then partitioned between chloroform and water. The chloroform layer is drawn off and the aqueous layer washed with chloroform. The chloroform solutions are combined, washed with brine, and dried over magnesium sulfate. The chloroform is removed in vacuo, leaving 27.5 g. of a brown oil which partially crystallizes when triturated with benzene and cooled. The crystalline material, 7.0 g., M.P. 122–125° C., is collected and recrystallized from isopropyl acetate to provide 5.1 g. (20%) of the desired product, M.P. 127–129° C.

Analysis.—Calcd. for $C_{11}H_{13}NO_4S$: C, 51.75; H, 5.13; N, 5.49; S, 12.56. Found: C, 51.83; H, 5.21; N, 5.28; S, 12.50.

Substances with various substituents in the 2-, 5-, 8-, and 9-positions according to the definitions of $R^2$, $R^5$, $R^8$, and $R^9$ of Formula I are prepared by adaptation of Procedure 1 to reaction of the appropriate phenethylamine and α-substituted acrylic ester. The resulting phenethylamino-propionic acid intermediates are then transformed according to the process of Example 1 to provide the desired product of Formula I. Illustration of how these substituent groups may be varied by the proper selection of starting materials is given in the following table. Other examples will be obvious to those skilled in the art.

MODIFICATION OF EXAMPLES TO PROVIDE VARIOUS SUBSTITUTED PRODUCTS

| $R^2$ | $R^5$ | $R^8$ | $R^9$ | Starting Materials Applied in Procedure 1 and Transformed According to Example 1 |
|---|---|---|---|---|
| $CH_3$ | H | H | H | Phenylisopropylamine, Methyl acrylate. |
| $n\text{-}C_4H_9$ | H | H | H | 1-phenyl-2-hexylamine, Ethyl acrylate. |
| H | $CH_3$ | H | H | β-Phenethylamine, Methyl methacrylate. |
| H | $n\text{-}C_4H_9$ | H | H | β-Phenethylamine, 2-methylene-1-hexanoic acid. |
| H | H | $CH_3$ | H | 2-(4-tolyl)ethylamine, Ethyl acrylate. |
| H | H | $n\text{-}C_4H_9O$ | H | 4-n-butoxyphenethylamine, Methyl acrylate. |
| H | H | $CH_3O$ | H | 4-methoxyphenethylamine, Isopropyl acrylate. |
| H | H | $CH_3$ | $CH_3O$ | 2-(3-methoxy-4-methylphenyl)ethylamine, Methyl acrylate. |
| H | H | $CH_3O$ | $CH_3O$ | 3,4-dimethoxyphenethylamine, Ethyl acrylate.* |
| H | H | $CH_2$ | O—<br>O— | 3,4-methylenedioxyphenethylamine, Ethyl acrylate. |

* Prepared in 85% yield, M.P. 192.5–193.5° C. after recrystallization from acetonitrile. Anal. calcd. for: $C_{19}H_{21}NO_5S$: C, 60.78; H, 5.64; S, 8.54. Found: C, 60.89; H, 5.58; S, 8.47.

Those modifications and equivalents which fall within the spirit of the invention and the scope of the appended claims are to be considered part of the invention.

What is claimed is:

1. A compound selected from the group consisting of compounds of the formula wherein $R^2$ is hydrogen or lower alkyl of from 1 to 4 carbon atoms;

$R^3$ is hydroxyl, lower alkoxy, lower alkyl, or di-lower alkylamino wherein said lower alkyl and lower alkoxy groups are of up to 6 carbon atoms, aryl of up to 12 carbon atoms, or aralkyl of up to 12 carbon atoms;

$R^5$ is hydrogen or lower alkyl of from 1 to 4 carbon atoms;

$R^8$ is hydrogen, lower alkyl of up to 4 carbon atoms, lower alkoxy of up to 4 carbon atoms, or considered together with $R^9$ forms the methylenedioxy group.

$R^9$ is hydrogen, lower alkyl of up to 4 carbon atoms, lower alkoxy of up to 4 carbon atoms, or considered together with $R^8$ forms the methylenedioxy group.

2. 3-benzenesulfonyl-1,2,3,4,5,6-hexahydro-3-benzazocin-6-one.

3. 3-methanesulfonyl-1,2,3,4,5,6-hexahydro-3-benzazocin-6-one.

4. 3-benzenesulfonyl-1,2,3,4,5,6-hexahydro-8,9-dimethoxy-3-benzazocin-6-one.

5. 3-sulfo-1,2,3,4,5,6-hexahydro-3-benzazocin-6-one.

6. A process for the preparation of a compound of the formula

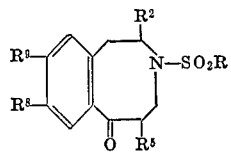

wherein $R^2$, $R^5$, $R^8$, and $R^9$ are as defined in claim 1, and R is selected from the group consisting of lower alkyl and di-lower alkylamino wherein said lower alkyl groups are of up to 6 carbon atoms, aralkyl of up to 12 carbon atoms, and aryl of up to 12 carbon atoms, which comprises heating a solution of an acid halide of the formula

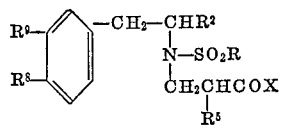

wherein R, $R^2$, $R^5$, $R^8$, and $R^9$ have the meaning given above and X is selected from the group consisting of chlorine and bromine in at least about 15 l. of an inert organic solvent per mole of said acid halide at a temperature of about 35 to 60° C. with from 1.1 to 2.5 molecular proportions of aluminum halide per mole of said compound.

7. The process of claim 6 wherein 2 molecular proportions of aluminum chloride are employed, and X is a chlorine atom.

8. The process of claim 6 wherein said solvent is methylene chloride.

9. The process of claim 6 wherein said temperature is in the range of 40–50° C.

10. The process of claim 6 wherein a reaction period of 2–3 hours is employed.

References Cited

Braun et al.: Ber. Deut. Chem., vol. 60, pp. 102–110 (1927).

ALTON D. ROLLINS, *Primary Examiner.*

U.S. Cl. X.R.

260—340.5, 456, 471, 502.6, 518, 519, 544, 999

UNITED STATES PATENT OFFICE
CERTIFICATE OF CORRECTION

Patent No. 3,442,890                                                                  May 6, 1969

Aubrey A. Larsen et al.

It is certified that error appears in the above identified patent and that said Letters Patent are hereby corrected as shown below:

In the heading to the printed specification, line 2, "-16-ONES" should read -- 6-ONES --. Column 1, line 53, "carbons" should read -- carbon --. Column 2, line 71, "given" should read -- give --. Column 3, line 5, "40-45°" should read -- 40-50° --. Column 4, line 40, "(0.2 mole)" should read -- (0.02 mole) --.

Signed and sealed this 14th day of April 1970.

(SEAL)
Attest:

Edward M. Fletcher, Jr.                                    WILLIAM E. SCHUYLER, JR.
Attesting Officer                                                     Commissioner of Patents